United States Patent Office 2,806,888
Patented Sept. 17, 1957

2,806,888
STABILIZING AQUEOUS ETHYLENE CHLORO-HYDRIN SOLUTIONS WITH ETHYLENE OXIDE

Harold S. Davis, Riverside, Conn., assignor to American Cyanamid Company, New York, N. Y., a corporation of Maine No Drawing. Application April 6, 1953,
Serial No. 347,176
1 Claim. (Cl. 260—632.5)

The present invention relates to stabilized aqueous alkylene chlorohydrin solutions. The invention particularly relates to aqueous solutions of alkylene chlorohydrins containing a small amount of an alkylene oxide as stabilizing agent.

In anhydrous form, ethylene chlorohydrin is stable. In aqueous solution, however, ethylene chlorohydrin hydrolyzes to ethylene glycol and hydrochloric acid, one mol of each being formed per mol of ethylene chlorohydrin decomposed. About 15% of the chlorohydrin is decomposed in 12 hours at 97° C. [Kirk-Othmer, Encyclopedia of Chemical Technology, vol. 3, page 852 (1950)]. The rate of hydrolysis is less at lower temperatures, but an objectionable acidity ultimately develops accompanied by disappearance of ethylene chlorohydrin.

The discovery has now been made that aqueous ethylene chlorohydrin solutions can be stabilized by the addition of a small amount of ethylene oxide thereto, preventing development of acidity for extended periods when the resulting solutions are stored or transported at or below normal temperatures, that is, below 50° C.

Ethylene chlorohydrin is soluble in all proportions in water and therefore aqueous solutions thereof may contain 1% to 99% of ethylene chlorohydrin by weight.

It has been found that the presence of a small amount down to a trace of ethylene oxide inhibits or retards this hydrolysis. Larger amounts prolong the stabilization effected. Thus broadly the compositions of the present invention consist essentially of an aqueous solution containing between about 1% and about 95%–99% by weight of ethylene chlorohydrin and an effective amount of ethylene oxide as stabilizer therefor. In practice, satisfactory stabilization is effected by the presence of from 0.5% to 5% of ethylene oxide based on the total weight of the solution, amounts of ethylene oxide in this range avoiding the danger of adding too little.

The discovery that ethylene oxide is a stabilizing agent for ethylene chlorohydrin possesses numerous additional advantages. In the first place, ethylene oxide is neutral, and therefore has no capacity to corrode. Then, it is compatible with the small amount of glycols normally found associated with aqueous ethylene chlorohydrin. Further, ethylene oxide is a wholly organic compound and therefore cannot be a source of metallic non-distillable impurities.

It is a most important advantage that the ethylene oxide can be substantially completely removed from the solutions by ordinary distillation procedures and, when so removed, may be re-used as stabilizing agent. The residue after distillation of the ethylene oxide is essentially aqueous ethylene chlorohydrin. Thus the addition of unnecessarily large proportions of ethylene oxide as stabilizing agent does no harm.

Solutions having varying concentrations of ethylene chlorohydrin are commonly prepared, and stable solutions are obtained by adding ethylene oxide thereto after neutralization when acid is present. For example, very dilute aqueous ethylene chlorohydrin is prepared industrially by reaction of ethylene with the dilute acid formed by reaction of chlorine with water. The ethylene chlorohydrin solutions thus obtained contain roughly 5%–10% of ethylene chlorohydrin.

More concentrated solutions can be prepared by distilling the very dilute solutions prepared as stated through an efficient fractionating column. A constant boiling mixture containing about 40%–45% ethylene chlorohydrin and 55%–60% of water by weight comes over as soon as equilibrium in the column is attained.

Still more concentrated aqueous solutions of ethylene chlorohydrin may be obtained by known means.

The present invention is particularly advantageously applied both to the aforementioned very dilute and constant boiling solutions. It is a feature of the present invention that addition of ethylene oxide to such very dilute solutions containing 5%–10% of ethylene chlorohydrin permits them to be stored or shipped without development of acidity after their preparation. It is a further feature of the present application that the constant boiling solutions containing 40%–45% of ethylene chlorohydrin may equally readily be stabilized, permitting such more concentrated solutions to be shipped and stored directly after distillation without development of acidity. These two solutions represent the principal dilutions at which ethylene chlorohydrin is commercially prepared.

The following example illustrates the preparation of stabilized solutions according to the present invention. The invention has been set forth above, and the example is not to be construed in limitation thereof.

*Example*

Dilute aqueous ethylene chlorohydrin is fractionally distilled at about 96° C. to give a constant boiling mixture containing about 42.5% ethylene chlorohydrin and 57.5% water by weight. The distillate is cooled to 20° C. and gaseous ethylene oxide is bubbled into the solution until a solution is obtained containing 1% of ethylene oxide by weight. The thus stabilized solution is stored in air-tight glass or steel containers.

If desired, 5% of ethylene oxide may be introduced by this means.

Although they have not been tested, there is no reason to doubt that other water soluble-alkylene oxides, for example, the propylene and butylene oxides, would equally act as stabilizing agents, adjustment being made for the difference in molecular weight. There is also no reason to doubt that aqueous solutions of other alkylene halohydrins, for example butylene chlorohydrin, propylene chlorohydrin and ethylene bromohydrin can be stabilized as described. It is to be understood that stabilized solutions containing these materials are therefore included within the scope of the present invention as defined by the appended claim.

I claim:

A method of inhibiting the hydrolysis of ethylene chlorohydrin in an aqueous solution of ethylene chlorohydrin at ambient temperature which comprises adding to said solution about 0.5%–5% of ethylene oxide based on the total weight of solution.

References Cited in the file of this patent

UNITED STATES PATENTS

| | | |
|---|---|---|
| 1,944,274 | Salzberg | Jan. 23, 1934 |
| 1,954,395 | Stampe | Apr. 10, 1934 |

FOREIGN PATENTS

| | | |
|---|---|---|
| 418,230 | Great Britain | Oct. 22, 1934 |
| 660,835 | Great Britain | Nov. 15, 1951 |

OTHER REFERENCES

Bronsted et al.: J. A. C. S., vol. 51, 1929, pages 428, 429, 460, 461.

Hantzch et al.: Berichte d. d. c. Ges.; vol. 40, 1514 (1907).

Bronsted et al.: J. A. C. S., vol. 51 (1929), pp. 428–461.

B. I. O. S., Final Report No. 776, Item No. 22; P. B. 60390 (1946), pp. 25–26.